(12) United States Patent
Wang

(10) Patent No.: US 6,733,163 B1
(45) Date of Patent: May 11, 2004

(54) VEHICLE AUXILIARY LIGHT ASSEMBLY

(76) Inventor: Calvin S. Wang, 768 S. Turnbull Canyon Rd., City of Industry, CA (US) 91745

( * ) Notice: Subject to any disclaimer, the term of this patent is extended or adjusted under 35 U.S.C. 154(b) by 48 days.

(21) Appl. No.: 10/232,940

(22) Filed: Sep. 3, 2002

(51) Int. Cl.[7] .............................. F21S 8/10; H05B 33/00
(52) U.S. Cl. ...................... 362/544; 362/84; 362/226; 362/228
(58) Field of Search ...................... 362/84, 216, 226, 362/228, 543–545, 548, 549

(56) References Cited

U.S. PATENT DOCUMENTS

| | | | | |
|---|---|---|---|---|
| 3,262,224 A | * | 7/1966 | Hardesty | 362/84 |
| 5,595,438 A | * | 1/1997 | Burd | 362/228 |
| 5,685,637 A | * | 11/1997 | Chapman et al. | 362/228 |
| 6,113,433 A | * | 9/2000 | Al-Turki | 362/228 |
| 6,168,282 B1 | * | 1/2001 | Chien | 362/84 |

FOREIGN PATENT DOCUMENTS

DE 4135596 A1 * 5/1993 .................. 362/84

* cited by examiner

*Primary Examiner*—Alan Cariaso
(74) *Attorney, Agent, or Firm*—Albert O. Cota

(57) ABSTRACT

A vehicle auxiliary light assembly (10) having a housing (12) that houses a conventional, central incandescent light bulb (56) and an electro-luminescent panel (ELP) (60) that is located around the inner perimeter of the housing (12). The ELP (60), depending on the luminescent material used, can be made to illuminate in various colors. The assembly (10) can be operated by either a first cable assembly (84) or a second cable assembly (85). The first cable assembly (84) allows the incandescent light bulb (56) and the ELP (60) to be operated independently of each other. The second cable assembly (85) allows the light (56) and the ELP (60) to be operated simultaneously.

14 Claims, 4 Drawing Sheets

VEHICLE AUXILIARY LIGHT ASSEMBLY

TECHNICAL FIELD

The invention pertains to the general field of vehicle lights and more particularly to a vehicle auxiliary light that incorporates a centered incandescent light and around its perimeter an electro-luminescent ring light.

BACKGROUND ART

One of the most popular ways to customize a vehicle is to alter the lights. Most vehicles come equipped with various conventional lights, such as head lights, tail lights, turn signal indicators, etc. While these lights do provide adequate illumination for normal driving, many people have discovered that by adding additional lights, such as fog lights, the ability to see and be seen improved substantially. As a result of this, some vehicle manufacturers now provide the additional lights as standard.

As is commonly known, many individuals prefer to individualize their vehicle by adding custom features. A novel approach to customizing would be to provide a means by which a person could alter the appearance and/or function of the illumination from light assemblies that come standard on the vehicle. In this manner, the light assemblies could function as originally intended and also provide a unique visual appearance.

The instant invention adds to the aesthetics and novelty of a conventional auxiliary light assembly by adding a ring-shaped electro-luminescent panel around the inner perimeter of a light assembly housing.

A search of the prior art patents and an industry literature search did not disclose any light assemblies that read on the claims of the instant invention.

DISCLOSURE OF THE INVENTION

A vehicle auxiliary light assembly such as a fog light which comprises a centered incandescent light and an electro-luminescent ring light that is located around the light assembly's perimeter. The light assembly comprises a housing that has an open front surface and a domed rear surface. A combination light receptacle and connector is attached to a connector bore located on the assembly. A plurality of wiring receptacles protrude from the front of the connector, extend through the connector and terminate with a plurality of respective pins, which protrude through the rear of the connector.

An electro-luminescent panel (ELP) is removably attached to a ring slot located on the light assembly's perimeter. Both the incandescent light bulb and the ELP are electrically connected to respective wiring receptacles to create an electrical circuit for the light assembly.

The incandescent light and the ELP that comprise the light assembly are powered by a vehicle battery. A cable assembly is utilized to apply and control the power that is applied from the battery to the light assembly. By utilizing a first cable assembly the incandescent light bulb and the ELP can be independently activated by use of a power-on light switch or a power-on ELF switch, respectively. A second cable assembly allows the incandescent light bulb and the ELP to be simultaneously turned on when a power-on light/ELF switch is closed. The power-on light/ELP switch is comprised of a vehicle switch that normally operates the auxiliary lights.

In view of the above disclosure, the primary object of the invention is to provide a vehicle auxiliary light assembly, such as a fog light, that in addition to having a conventional centered incandescent light bulb, utilizes an electro-luminescent panel to provide illumination around the auxiliary light's perimeter.

It is also an object of the invention to provide a vehicle auxiliary light assembly that:

adds a unique visible alteration to conventional light assemblies, is easy to install, simple to use and maintenance free, requires a small amount of power for operation, can be provide as a standard OEM addition to a vehicle light assembly, or may be sold as an after-market item, and is cost effective from a manufacturer's and a consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
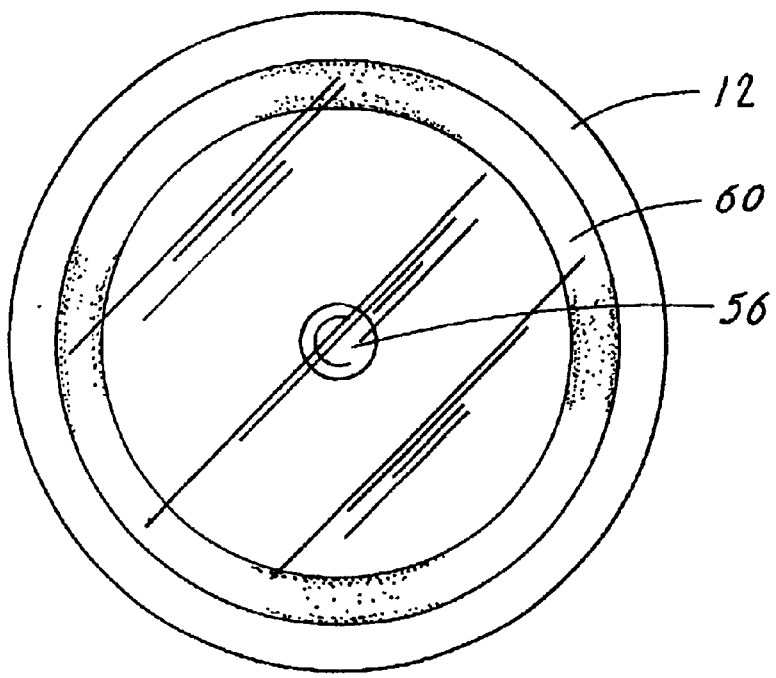
FIG. 1 is a front elevational view of an auxiliary vehicle light assembly that includes in addition to a centered incandescent light, an electro-luminescent panel (ELP) located around the front inner perimeter of the light assembly.

The best mode for carrying out the invention is presented in terms of a preferred embodiment for a vehicle auxiliary light assembly 10, with the auxiliary light typically functioning as a fog light. The assembly includes a centered, incandescent light bulb and a perimeter electro-luminescent panel (ELP). The ELP can be activated by itself or in combination with the centered incandescent light.

The preferred embodiment of the vehicle auxiliary light assembly 10, (hereinafter "VALA 10"), as shown in FIGS. 1–6 is comprised of the following major elements: a light assembly housing 12, a combination light receptacle and connector 28, an incandescent light bulb 56, an ELP 60, a first cable assembly B4 and a second cable assembly 85.

Figure 2:
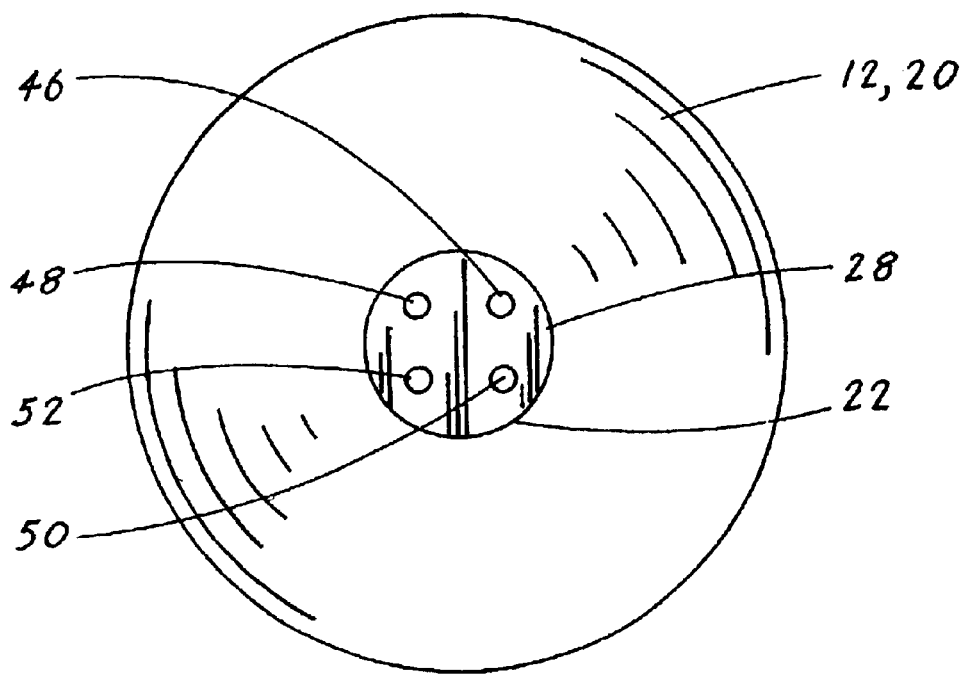
FIG. 2 is a rear elevational view of an auxiliary vehicle light assembly showing the central location of a combination light receptacle and connector.
Figure 3:
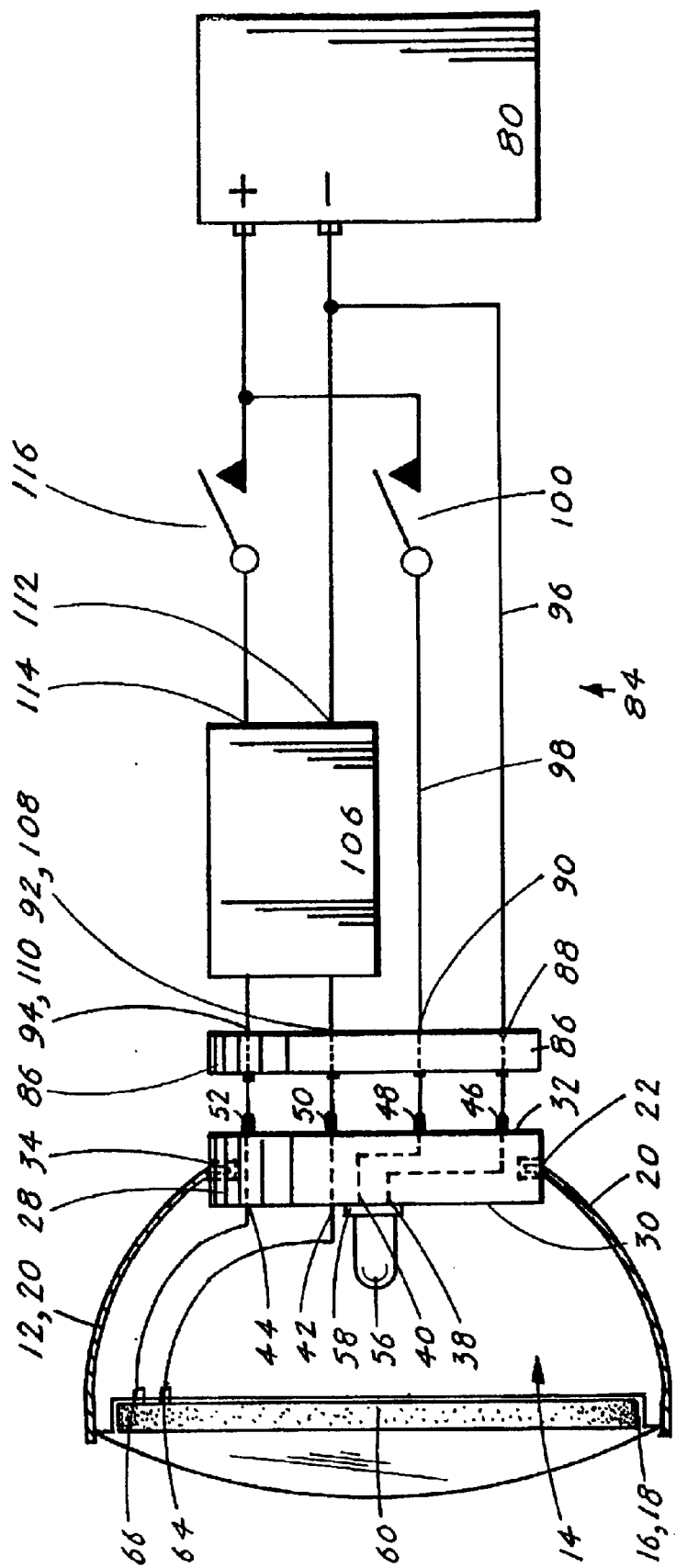
FIG. 3 is a wiring diagram showing the centered light and the ELP independently connected to a vehicle 12-volt d-c power source via separate power-on switches.

The light assembly housing 12, as shown in FIGS. 1–3, can be designed to have a circular, an elliptical or rectangular frontal shape and is comprised of an open front surface 14 and a domed rear surface 20. The front surface 14 has around its inner perimeter 16 a ring slot 18, and the rear surface 20 has a substantially centered connector bore 22.

As shown in FIGS. 2 and 3, the combination light receptacle and connector 28, which is constructed of a resilient material is comprised of a front surface 30, a rear surface 32 and a perimeter slot 34. The perimeter slot 34 is dimensioned to fit into and be attached to the centered connector bore 22 on the assembly housing 12. The light receptacle and connector 28 also comprises a first wiring receptacle 38, a second wiring receptacle 40, a third wiring receptacle 42, and a fourth wiring receptacle 44. All four wiring receptacles 38,40,42,44 protrude from the front surface 30 of the connector 28, extend through the connector and terminate with a respective first pin 46, second pin 48, third pin 50, and fourth pin 52 which protrude through the rear surface 32 of the connector 28.

Figure 4:
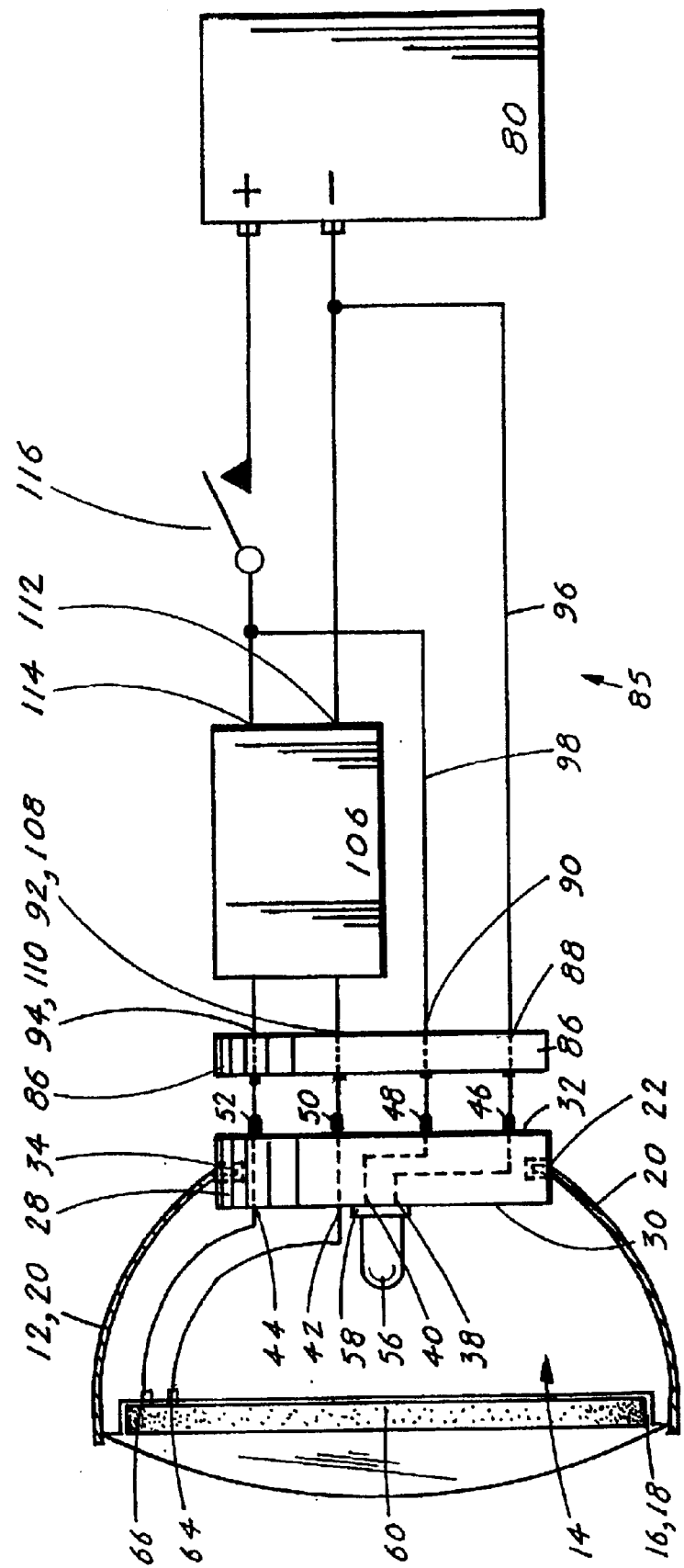
FIG. 4 is a wiring diagram showing the centered light and the ELP connected to the vehicle battery via a single power-on switch.

The incandescent light bulb 56, which consists of an H3 bulb is also an element of the connector 28, is removably inserted into a light receptacle 58 that extends from the front surface 30 of the connector 28, as shown in FIGS. 3 and 4. The light bulb receptacle 58 is electrically connected to the first and second wiring receptacles 38,40.

Figure 5:
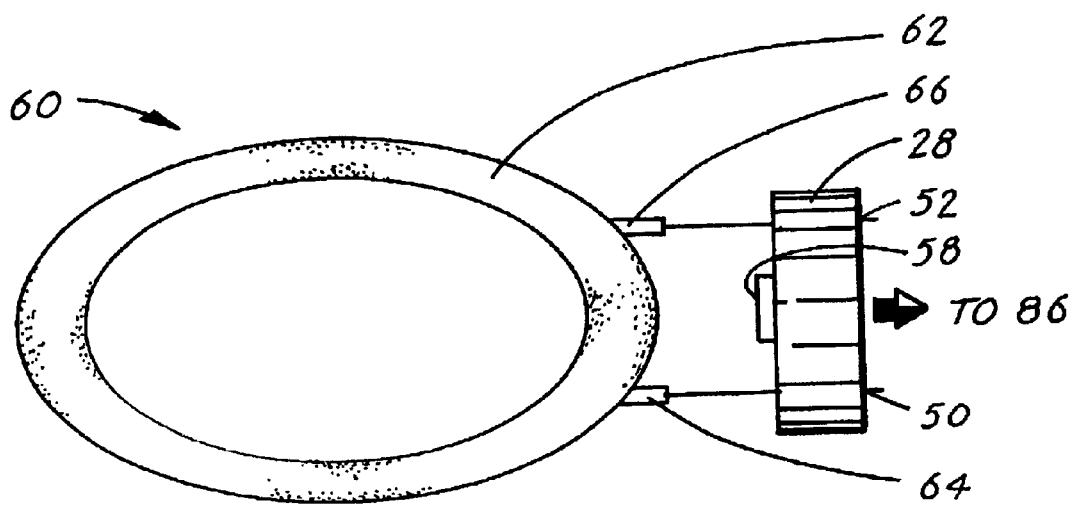
FIG. 5 is a wiring diagram showing a single ELP connected to a combination light receptacle and connector.

The electro-luminescent panel (ELP) 60 is configured to be removably attached to the ring slot 18. The ELP 60, as shown best in FIGS. 1, 3 and 4, comprises a first terminal 64 that is electrically connected to the third wiring receptacle 42, and a second terminal 66 that is electrically connected to the fourth wiring receptacle 44. As shown in FIG. 5 the ELP 60 can be also comprised of a continuous structure having attached thereto a first terminal 64 and a second terminal 66.

Figure 6:
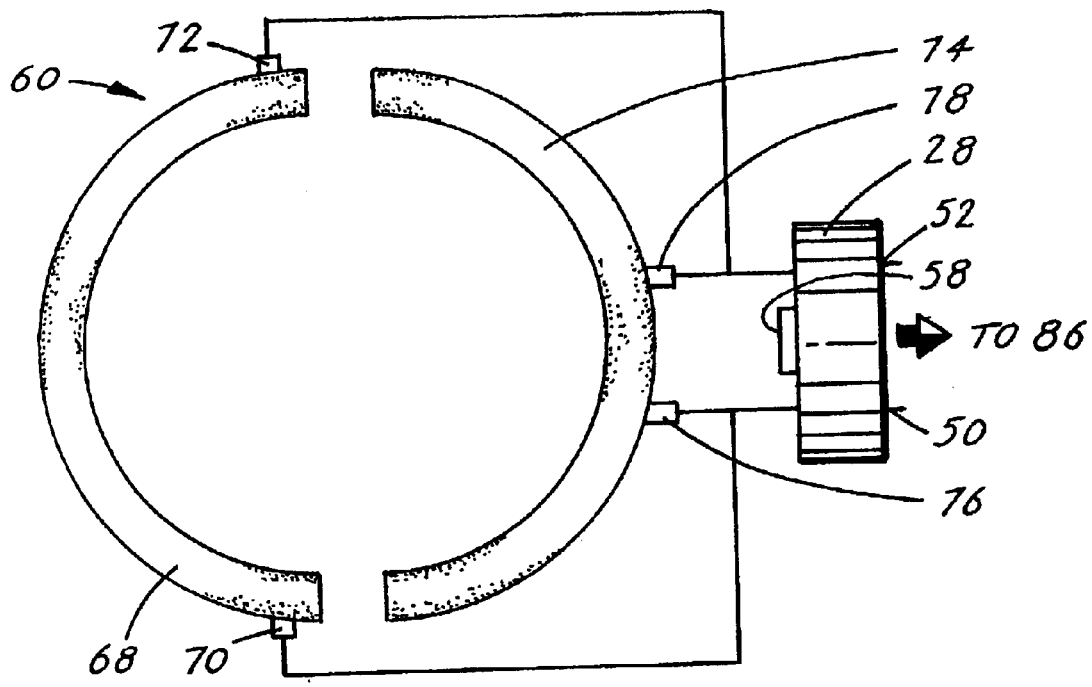
FIG. 6 is a wiring diagram showing a left ELP section and a separate right ELP section wherein both ELP sections are connected in parallel to a combination light receptacle and connector.

Additionally, as shown in FIG. 6, the ELP 60 can consist of a left section 68 having a first terminal 70 and a second terminal 72, and a right section 74 having a first terminal 76 and a second terminal 78. The left section 68 is electrically connected in parallel with the right section 74.

In order to provide power to the VALA 10, a vehicle battery 80 as shown in FIG. 3, having a positive terminal and a negative terminal is utilized.

The final element of the VALA 10 is a cable assembly which has means for applying and controlling the power provided from the battery 80.

As shown in FIG. 3, the first cable assembly 84 is comprised of a connector 86 having a first receptacle 86, a second receptacle 90, a third receptacle 92, and a fourth receptacle 94. The receptacles 88,90,92,94 correspond sequentially to the numbered pins 46,48,50,52 on the combination light receptacle connector 28. A first lead 96 is connected between the first receptacle 88 and the negative terminal of the battery 80. A second lead 98 is connected between the second receptacle 90, through a power-on light switch 100 to the positive terminal of the battery 80. As shown in FIGS. 3 and 4, an inverter 106 comprises an output and an input. The output consists of a first output lead 108 and a second output lead 110 that are connected respectively to the third and fourth receptacles 92,94. The input consists of a first input lead 112 and a second input lead 114.

The first input lead 112 is connected to the negative terminal of the battery 80 and the second input lead 114 is connected through a power-on ELP switch 116 to the positive terminal of the battery 80.

The first cable assembly 84, as shown in FIG. 3, allows the incandescent light bulb 56 and the ELP 60 to be independently activated by means of the power-on light switch 100 and the power-on ELP switch 116, respectively.

The second cable assembly 85, as shown in FIG. 4, is comprised of a connector 86 having a first receptacle 88, a second receptacle 90, a third receptacle 92 and a fourth receptacle 94. The receptacles 88,90,92,94 correspond sequentially to the numbered pins 46,48,50,52 on the combination connector 28. A first lead 96 is connected between the first receptacle 88 and the negative terminal of the battery 80. A second lead 98 is connected between the second receptacle 90, through a power-on light/ELP switch 118 to the positive terminal to the battery 80. An inverter 106 comprises an output and an input, the output consists of a first output lead 108 and a second output lead 110 that are respectively connected to the third and fourth receptacles 92,94.

The input consists of a first input lead 112 and a second input lead 114. The first input lead 112 is connected to the negative terminal of the battery go. The second input lead 114 is connected through the power-on light/ELP switch 118 to the positive terminal of the battery 80.

The second cable assembly 85 allows the incandescent light bulb 56 and the ELP 60 to be simultaneously turned on when the power-on light/ELP switch 118 is closed. The power-on light/ELP switch 118 is comprised of a vehicle switch that normally operates the auxiliary lights.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

What is claimed is:

1. A vehicle auxiliary light assembly comprising:
    a) a light assembly housing having an open front surface and a domed rear surface, wherein the open front surface having around its inner perimeter a ring slot, wherein the domed rear surface having a substantially centered connector bore,
    b) a combination light receptacle and connector having:
        (1) a front surface, a rear surface and a perimeter slot dimensioned to fit into and be attached to the centered connector bore on said assembly housing,
        (2) a first wiring receptacle, a second wiring receptacle, a third wiring receptacle and a fourth wiring receptacle, wherein said receptacles protrude from the front surface of said connector, extend through said connector and terminate with a first pin, second pin, third pin and fourth pin respectively, that protrude through the rear surface of said connector,
        (3) an incandescent light bulb removably inserted into a light receptacle extending from the front surface of said connector, wherein the light bulb receptacle is electrically connected to the first and second wiring receptacles,
    c) an electro-luminescent panel (ELP) configured to be removably attached to the ring slot, wherein said ELP having a first terminal electrically connected to the third wiring receptacle, and a second terminal electrically connected to the fourth wiring receptacle,
    d) a vehicle battery having a positive terminal and a negative terminal, and
    e) a cable assembly having means for applying and controlling the power applied by said vehicle battery to said vehicle auxiliary light assembly.

2. The assembly as specified in claim 1 wherein said auxiliary light function as a fog light.

3. The assembly as specified in claim 1 wherein said light assembly housing comprises a circular frontal shape.

4. The assembly as specified in claim 1 wherein said light assembly housing comprises an elliptical frontal shape.

5. The assembly as specified in claim 1 wherein said light assembly housing comprises a rectangular frontal shape.

6. The assembly as specified in claim 1 wherein said combination light receptacle and connector is constructed of a resilient material.

7. The assembly as specified in claim 1 wherein said incandescent light bulb is comprised of an H3 bulb.

8. The assembly as specified in claim 1 wherein said cable assembly consists of a first cable assembly comprising:
   a) a connector having a first receptacle, a second receptacle, a third receptacle and a fourth receptacle, wherein the receptacles correspond sequentially to the numbered pins on the combination light receptacle connector,
   b) a first lead connected between the first receptacle and the negative terminal of said battery,
   c) a second lead connected between the second receptacle, through a power-on light switch to the positive terminal of said battery, and
   d) an inverter having an output and an input, wherein the output consists of a first output lead and a second output lead that are connected respectively to the third and the fourth receptacles, wherein the input consists of a first input lead and a second input lead, wherein the first input lead is connected to the negative terminal of said vehicle battery and the second input lead is connected through a power-on ELP switch to the positive terminal of said vehicle battery, wherein said first cable assembly allows the incandescent light-bulb and said ELP to be independently activated by means of the power-on light switch and the power-on ELP switch respectively.

9. The assembly as specified in claim 1 wherein said cable assembly consists of a second cable assembly comprising:
   a) a connector having a first receptacle, a second receptacle, a third receptacle and a fourth receptacle, wherein the receptacles correspond sequentially to the numbered pins on the combination connector,
   b) a first lead connected between the first receptacle and the negative terminal of said battery,
   c) a second lead connected between the second receptacle, through a power-on light/ELP switch to the positive terminal of said vehicle battery, and
   d) an inverter having an output and an input, wherein the output consists of a first output lead and a second output lead that are connected respectively to the third and the fourth receptacles, wherein the input consists of a first input lead and a second input lead, wherein the first input lead is connected to the negative terminal of said vehicle battery and the second input lead is connected through the power-on light/ELP switch to the positive terminal of said vehicle battery, wherein said second cable assembly allows the incandescent light bulb and said ELP to be simultaneously turned on when the power-on light/ELP switch is closed.

10. The assembly as specified in claim 9 wherein said power-on light/ELP switch is comprised of a vehicle switch that normally operates the auxiliary lights.

11. The assembly as specified in claim 1 wherein said ELP is comprised of a continuous structure having attached a first terminal and a second terminal.

12. The assembly as specified in claim 1 wherein said ELP is comprised of a left section having a first terminal and a second terminal and a right section also having a first terminal and a second terminal, wherein the right section is electrically connected in parallel with the left section.

13. The assembly as specified in claim 11 wherein said ELP has a circular cross-section.

14. The assembly as specified in claim 11 wherein said ELP has a square cross-section.

* * * * *